(No Model.)
A. RIPLEY.
APPLIANCE FOR SUSPENDING DROP HARNESS.
No. 548,459. Patented Oct. 22, 1895.
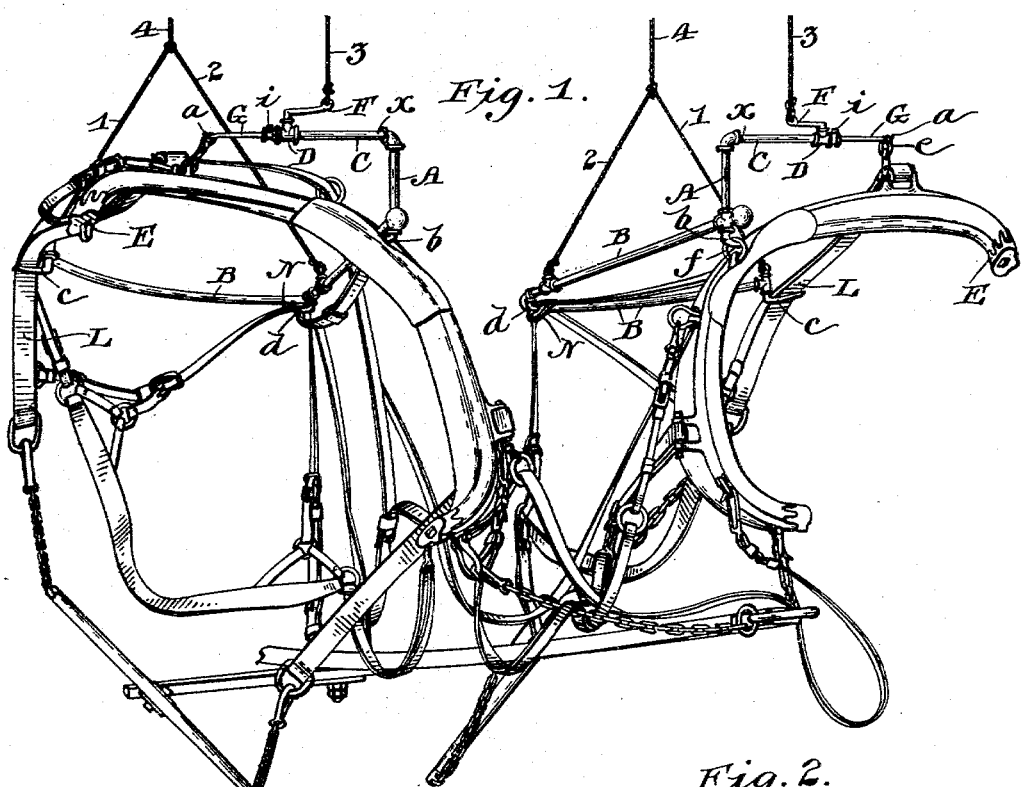
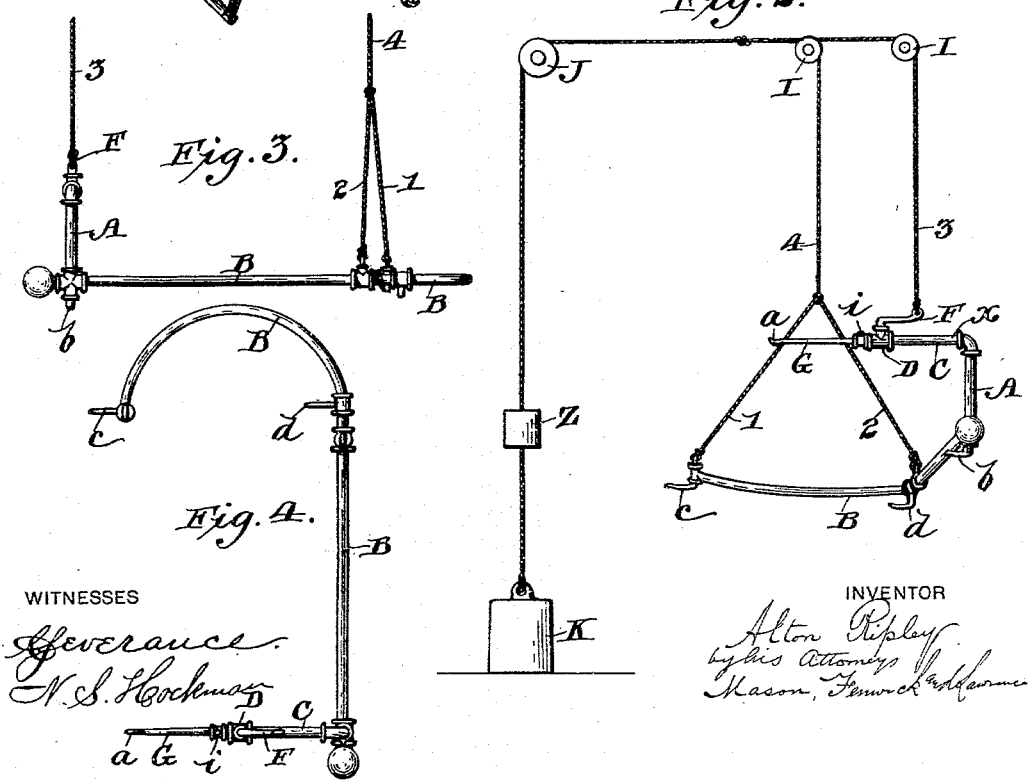
WITNESSES
INVENTOR
Alton Ripley
by his attorneys
Mason, Fenwick & Lawrence

United States Patent Office.

ALTON RIPLEY, OF OSHKOSH, WISCONSIN.

APPLIANCE FOR SUSPENDING DROP-HARNESS.

SPECIFICATION forming part of Letters Patent No. 548,459, dated October 22, 1895.

Application filed August 5, 1895. Serial No. 558,273. (No model.)

*To all whom it may concern:*

Be it known that I, ALTON RIPLEY, a citizen of the United States, residing at Oshkosh, in the county of Winnebago and State of Wisconsin, have invented certain new and useful Improvements in Appliances for Suspending Drop-Harness; and I do declare the following to be a full, clear, and exact description of the invention, such as will enable others skilled in the art to which it appertains to make and use the same, reference being had to the accompanying drawings, and to the letters and numerals of reference marked thereon, which form a part of this specification.

My invention relates to improvements in appliances for suspending drop-harness; and it consists of certain novel constructions, combinations, and arrangements of parts, all of which will be hereinafter set forth and claimed.

In the accompanying drawings a general view of the device as applied to double harness is shown in Figure 1, with the harness suspended thereon. Fig. 2 is a front view, Fig. 3 a side view, and Fig. 4 a plan view, of the suspending-frame.

Similar letters and numerals refer to similar parts in each view.

Each appliance is suspended by the cords 1 and 2 in the rear, joining into one cord 4 and the cord 3 in front, which attach to rings or eyes in the frame. The suspending-cords pass upward and over pulleys I I and J, attached to the ceiling and downward to a weight Z, which operates to raise the suspending device when released. The weight K rests upon the floor and is used to counterbalance the weight of the harness when suspended. Springs may be used instead of weights for this purpose, if desired.

The suspending-frame consists, essentially, of the curved body portion B, the upright portion A, and the horizontal hollow tube C, forming a sleeve in which the rod G slides to provide adjustment to large and small collars, the rod G being held at the desired position by the set-screw $i$.

D is a slide surrounding the tube C and made to slide freely thereon. The cord 3 is attached to the arm F, extending from the slide D.

The harness is hung upon the laterally-extending hooks $a\ b$ in front and $c\ d$ in the rear, and the rings $e\ f$ are attached to the collar for this purpose. The rings $e\ f$ hang upon the hooks $a\ b$ to support the front portion of the harness and the back portion is suspended upon the hooks $c\ d$, the outer trace L resting upon the hook $c$, so that the horse can pass under it, and the shield N, at the junction of the hip-straps, which support the breeching, resting upon the hook $d$, as shown in Fig. 1. All of the hooks extend toward the outer side of the harness in practically a horizontal direction when the harness is suspended, so that when the horse is in position beneath the harness all that is necessary to operate the device is to close the collar. When the end E of the collar is pressed downward to close the collar, the hook $a$ is pulled downward, inclining the whole frame toward the outer side of the harness. When a sufficient incline is reached the straps L and N slide off from the hooks $c$ and $d$, and at the same time the slide D slides upward to $x$ on the tube C, releasing the rings $e$ and $f$, and the harness is thereby fully released and left upon the horse, the suspending device being pulled toward the ceiling by the weight Z, as hereinbefore described.

A different design of hook may be used at $b$ and $d$, so as to retain the suspending device in connection with the harness after the collar is coupled. This form will be of use in practice hitching or where in fire departments an apparatus is held for a second alarm, obviating the necessity of readjusting the device if the apparatus is not ordered out. In this latter form of device the hooks $b$ and $d$ may be afterward detached by means of connection with the reins or in any other manner.

Having now described my invention, what I claim as new, and desire to secure by Letters Patent, is—

1. A harness support comprising a curved frame having lateral main harness supporting hooks, an angular frame rigidly connected to said first mentioned frame and provided with lateral collar supporting hooks, a sliding support loosely mounted on said latter frame and adapted to hold both of said frames and the hooks normally horizontal; the construction and operation being such that the sliding support slides on the angular frame when one side of the collar is depressed and thus shifts the center of gravity and causes both of the frames to tip and the hooks to disengage from the harness, substantially as described.

2. A harness support comprising a curved frame having lateral main harness supporting hooks, an angular frame rigidly connected to said first mentioned frame and provided with a lateral collar supporting hook, an arm adjustably mounted in said latter frame and provided with a harness supporting hook, a sliding support loosely mounted on said latter frame and adapted to hold both of said frames and the hooks normally horizontal, and devices for elevating said frames when the harness is released; the construction and operation being such that the sliding support slides on the angular frame when one side of the collar is depressed and thus shifts the center of gravity and causes both of the frames to tip and the hooks to disengage from the harness, substantially as described.

In testimony whereof I affix my signature in presence of two witnesses.

ALTON RIPLEY.

Witnesses:
W. H. WYMAN,
HENRY HENKEL.